(12) United States Patent
Hata et al.

(10) Patent No.: US 9,758,161 B2
(45) Date of Patent: Sep. 12, 2017

(54) HYBRID VEHICLE, AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Kensei Hata, Susono (JP); Yuji Iwase, Mishima (JP); Yosuke Suzuki, Susono (JP); Koichi Kato, Nagoya (JP); Seitaro Nobuyasu, Susono (JP); Taro Moteki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/906,641

(22) PCT Filed: Aug. 1, 2014

(86) PCT No.: PCT/IB2014/001438
§ 371 (c)(1),
(2) Date: Jan. 21, 2016

(87) PCT Pub. No.: WO2015/019150
PCT Pub. Date: Feb. 12, 2015

(65) Prior Publication Data
US 2016/0159344 A1    Jun. 9, 2016

(30) Foreign Application Priority Data

Aug. 8, 2013 (JP) .................. 2013-165304

(51) Int. Cl.
B60W 10/02 (2006.01)
B60W 10/06 (2006.01)
(Continued)

(52) U.S. Cl.
CPC ............. *B60W 20/40* (2013.01); *B60K 6/365* (2013.01); *B60K 6/387* (2013.01); *B60K 6/442* (2013.01);
(Continued)

(58) Field of Classification Search
CPC ........ B60K 6/387; B60K 6/442; B60K 6/365; B60K 6/445; Y02T 10/6239;
(Continued)

(56) References Cited

U.S. PATENT DOCUMENTS

| 5,788,006 A | 8/1998 | Yamaguchi | |
| 2006/0017414 A1* | 1/2006 | Joe | B60K 6/445 318/432 |

(Continued)

FOREIGN PATENT DOCUMENTS

| CN | 1951741 A | 4/2007 |
| JP | H08-295140 A | 11/1996 |

(Continued)

*Primary Examiner* — Atul Trivedi
(74) *Attorney, Agent, or Firm* — Oliff PLC (57) ABSTRACT

At the time of changing from an EV mode, in which a hybrid vehicle travels with the use of a second motor provided on an output side of a differential mechanism while torque that acts on any one of rotating elements of the differential mechanism is interrupted by a clutch, to an HV mode, in which the hybrid vehicle travels while transmitting output torque of an engine to a drive wheel, when the engine is started in a state where the clutch is slipped and torque is transmitted from the engine so as to increase the rotation speed of the first rotating element while the clutch is slipped, torque starts being output from a first motor such that torque input from the first rotating element to the differential mechanism to increase the rotation speed of the drive wheel is output from the third rotating element.

4 Claims, 4 Drawing Sheets

(51) Int. Cl.
*B60K 6/442* (2007.10)
*B60W 20/40* (2016.01)
*B60K 6/365* (2007.10)
*B60W 10/08* (2006.01)
*F16D 48/06* (2006.01)
*B60K 6/387* (2007.10)
*B60K 6/445* (2007.10)

(52) U.S. Cl.
CPC ............ *B60K 6/445* (2013.01); *B60W 10/02* (2013.01); *B60W 10/06* (2013.01); *B60W 10/08* (2013.01); *F16D 48/06* (2013.01); B60W 2510/0638 (2013.01); B60W 2710/025 (2013.01); B60W 2710/027 (2013.01); B60W 2710/083 (2013.01); B60Y 2200/92 (2013.01); B60Y 2300/182 (2013.01); B60Y 2300/42 (2013.01); B60Y 2300/43 (2013.01); B60Y 2300/60 (2013.01); B60Y 2300/80 (2013.01); F16D 2500/1066 (2013.01); F16D 2500/3067 (2013.01); F16D 2500/3069 (2013.01); F16D 2500/30401 (2013.01); F16D 2500/50858 (2013.01); F16D 2500/7041 (2013.01); F16D 2500/7044 (2013.01); Y02T 10/6239 (2013.01); Y02T 10/6286 (2013.01); Y10S 903/93 (2013.01)

(58) Field of Classification Search
CPC ........ Y02T 10/6286; B60W 2710/025; B60W 2710/027; B60W 2710/083; B60W 20/40; B60W 10/08; B60W 10/02; B60W 10/06; B60W 2510/0638; B60Y 2300/43; B60Y 2300/42; B60Y 2300/182; B60Y 2300/80; B60Y 2300/60; B60Y 2200/92; Y10S 903/93; F16D 2500/1066; F16D 2500/30401; F16D 2500/3067; F16D 2500/3069; F16D 2500/50858; F16D 2500/7041; F16D 2500/7044; F16D 48/06
USPC .......................... 701/22; 180/65.23; 903/930
See application file for complete search history.

(56) References Cited

U.S. PATENT DOCUMENTS

| | | | |
|---|---|---|---|
| 2007/0056784 A1* | 3/2007 | Joe ........................ | B60K 6/48 180/65.245 |
| 2007/0080005 A1* | 4/2007 | Joe ........................ | B60K 6/48 180/65.245 |
| 2007/0087894 A1 | 4/2007 | Tsuneyoshi et al. | |
| 2007/0102207 A1* | 5/2007 | Yamanaka ............... | B60K 6/48 180/65.31 |
| 2007/0102211 A1* | 5/2007 | Nozaki .................... | B60K 6/48 180/65.7 |
| 2007/0114082 A1* | 5/2007 | Nozaki .................... | B60K 6/48 180/65.6 |
| 2007/0227791 A1* | 10/2007 | Ueno ..................... | B60K 6/387 180/65.245 |
| 2007/0275823 A1* | 11/2007 | Motosugi ................ | B60K 6/48 477/176 |
| 2008/0058154 A1* | 3/2008 | Ashizawa ............... | B60K 6/36 477/5 |
| 2009/0288895 A1* | 11/2009 | Klemen .................. | B60K 6/365 180/65.25 |
| 2011/0021312 A1* | 1/2011 | Fukitani ................. | B60K 6/48 477/5 |
| 2012/0028749 A1* | 2/2012 | Kawasaki ............... | B60K 6/48 475/211 |
| 2013/0297128 A1* | 11/2013 | Takamura ............... | B60K 6/48 701/22 |
| 2013/0297136 A1* | 11/2013 | Yamanaka .............. | B60K 6/48 701/22 |
| 2015/0051767 A1* | 2/2015 | Mohri .................... | B60L 11/005 701/22 |
| 2015/0298690 A1* | 10/2015 | Onouchi ................. | B60K 6/48 701/22 |
| 2016/0229387 A1* | 8/2016 | Hata ...................... | B60K 6/365 |

FOREIGN PATENT DOCUMENTS

| | | |
|---|---|---|
| JP | 2005-162081 A | 6/2005 |
| JP | 2005-307766 A | 11/2005 |
| JP | 2007-112258 A | 5/2007 |
| JP | 2012-228961 A | 11/2012 |
| JP | 2013-023024 A | 2/2013 |
| JP | 2013-043570 A | 3/2013 |
| KR | 2007-0091392 A | 9/2007 |

* cited by examiner

| DRIVE MODE | K0 CLUTCH<br>ENGAGED: ○<br>RELEASED: — |
|---|---|
| ENGINE-SEPARATED EV MODE | — |
| ORDINARY EV MODE | ○ |
| HV MODE | ○ |

FIG. 8

HYBRID VEHICLE, AND CONTROL METHOD FOR HYBRID VEHICLE

BACKGROUND OF THE INVENTION

1. Field of the Invention

The invention relates to a hybrid vehicle including an engine and a motor or motor generator as driving force sources, and a control method for the hybrid vehicle. Particularly, the invention relates to a hybrid vehicle configured to be able to separate an engine from a driving force transmission system, and a control method for the hybrid vehicle.

2. Description of Related Art

A hybrid vehicle including a motor or a motor generator (hereinafter, these may be collectively referred to as motor) as a power source together with an engine has various advantages. For example, the hybrid vehicle is able to stop the engine (stop the engine at idle), is able to regenerate energy with the use of the motor during deceleration, and is able to operate the engine at an operating point at which energy efficiency is high. Particularly, by extending a time in which the hybrid vehicle travels with the use of the motor, the effect of improving the fuel economy of the vehicle as a whole increases. This is because the engine is stopped and no fuel is consumed in the case of motor running. In this case, in order to reduce a power loss resulting from rotation together with the engine, it is desirable to separate the engine from the motor that outputs driving force for propelling the vehicle or from a power transmission system that transmits the driving force to wheels. When such a clutch for separating the engine is provided, an operation mode in which the engine is stopped or driven is selected during motor running. The hybrid vehicle including the clutch for separating the engine is described in Japanese Patent Application Publication No. 08-295140 (JP 08-295140 A).

The configuration will be simply described. A generator is coupled to a first rotating element in a differential mechanism, such as a planetary gear mechanism, including three rotating elements, a second rotating element serves as an output element, and a third rotating element is coupled to braking means. The engine is coupled to the third rotating element via the clutch. Thus, with the configuration described in JP 08-295140 A, the differential mechanism functions as a speed reducer or a speed increaser when the third rotating element is fixed by the engine or the braking means, so it is possible to cause the generator coupled to the first rotating element to function as the motor and to transmit the torque to the output element. That is, the hybrid vehicle is able to travel by using power that is output from the generator and the motor. When a one-way clutch that is engaged to fix the third rotating element when torque in a direction to rotate the third rotating element in the reverse direction acts on the third rotating element is employed as the braking means, the third rotating element is allowed to be fixed not by the engine but by the one-way clutch during motor running, and the clutch is also allowed to be separated from the third rotating element. Therefore, it is possible to continue driving the engine or stop the engine. During engine running, that is, when the hybrid vehicle travels by transmitting the output torque of the engine as driving force, it is possible to control the rotation speed of the engine coupled to the third rotating element via the clutch by controlling the rotation speed of the generator coupled to the first rotating element. That is, the differential mechanism is allowed to function as a continuously variable transmission.

Japanese Patent Application Publication No. 2013-023024 (JP 2013-023024 A) describes a hybrid vehicle including a differential mechanism having one rotating element to which an engine is coupled and the other rotating element to which a motor generator is coupled. The hybrid vehicle is configured to crank the engine by using the output torque of the motor generator and to control the output torque of the motor generator such that the output torque acts on the differential mechanism as reaction force after the engine is started. Specifically, when a required driving force after the engine is started is relatively small, a target rotation speed of the engine is also low. Therefore, in order for the engine rotation speed to quickly follow the target rotation speed after an engine start, the output torque of the motor generator is configured to rapidly increase. When a required driving force after the engine is started is relatively large, the target rotation speed of the engine is also high. Therefore, the output torque of the motor generator is configured to slowly increase.

Japanese Patent Application Publication No. 2012-228961 (JP 2012-228961 A) describes a hybrid vehicle in which an engine and a transmission are coupled to each other via a clutch and a motor generator is coupled to an input shaft of the transmission. At the time of changing from motor running where the engine is stopped to engine running, the engine is configured to be cranked by engaging the clutch with a small rotation speed difference between an input-side rotating member and output-side rotating member of the clutch through upshifting of the transmission. Specifically, the output-side inertia torque of the clutch is generated through shifting, and an engagement pressure of the clutch is controlled on the basis of the inertia torque. JP 2012-228961 A describes that, by controlling in this way, it is possible to crank the engine and to suppress or prevent transmission of the inertia torque to drive wheels.

SUMMARY OF THE INVENTION

The hybrid vehicle configured as described in JP 08-295140 A starts the engine and engages the clutch on the basis of a request to change into engine running while the hybrid vehicle is carrying out motor running with the engine stopped. During engine running, an operating point of the engine is determined on the basis of a required driving force and an optimal fuel economy line set such that the fuel economy of the engine is high. Therefore, at the time of changing into engine running because of a large required driving force, the engine is controlled to a high rotation speed after the engine is started and the clutch is engaged. Thus, the engine rotation speed is controlled by controlling the rotation speed of the generator coupled to the first rotating element. Therefore, in order to increase the engine rotation speed, the generator may be driven as a motor and output torque in the same direction as the direction of the output torque of the engine. If torque is output from the generator in the same direction as the direction of the output torque of the engine, the generator does not function to output reaction force until the engine rotation speed becomes the target rotation speed. Therefore, there is a possibility that the output torque of the engine is not transmitted to the drive wheels. Therefore, there may occur a delay in response of control for changing from motor running with the engine stopped to engine running.

The hybrid vehicle configured as described in JP 2013-023024 A controls the output torque of the motor generator on the basis of a required driving force, so it is possible to transmit the output torque of the engine as driving force after an engine start. However, when the clutch is provided between the engine and the differential mechanism, it is presumable that the clutch is engaged, the engine is cranked and then the engine is started and, after that, the output torque of the motor generator is controlled to act on the differential mechanism as reaction force. Therefore, at the time of changing from motor running to engine running, a time is required in order to engage the clutch. Therefore, at the time of changing from motor running with the engine stopped to engine running, there may occur a delay in response until the output torque of the engine is output as driving force.

The invention provides a hybrid vehicle that is able to quickly transmit the output torque of an engine as driving force at the time of changing from motor running with the engine stopped to engine running, and a control method for the hybrid vehicle.

A first aspect of the invention provides a hybrid vehicle. The hybrid vehicle includes: an engine; a drive wheel; a first motor; a second motor transmitting torque to the drive wheel; a differential mechanism including a first rotating element transmitting torque of the engine, a second rotating element transmitting torque of the first motor, and a third rotating element transmitting torque to the drive wheel; a clutch controlling a capacity of torque that acts on any one of the first rotating element, the second rotating element and the third rotating element; and a control unit configured to change from an EV mode, in which the hybrid vehicle travels in a state where the clutch is released and an output torque of the second motor is transmitted to the drive wheel, to an HV mode, in which the hybrid vehicle travels in a state where the clutch is engaged and an output torque of the engine is transmitted to the drive wheel, in the following manner, (a) starting the engine in a state where the clutch is slipped, and (b) increasing a rotation speed of the drive wheel by outputting torque from the first motor such that torque input from the first rotating element to the differential mechanism is output from the third rotating element, when torque is transmitted from the engine while a rotation speed of the first rotating element is rising in a state where the clutch is slipped.

The control unit may be configured to increase the rotation speed of the drive wheel by outputting torque from the first motor such that torque input from the first rotating element to the differential mechanism is output from the third rotating element, when a rotation speed of the engine becomes higher than or equal to the rotation speed of the first rotating element.

The control unit may be configured to control an output torque of the first motor to zero when the control unit starts the engine.

A second aspect of the invention provides a control method for a hybrid vehicle. The hybrid vehicle includes an engine, a drive wheel, a first motor, a second motor transmitting torque to the drive wheel, a differential mechanism including a first rotating element transmitting torque of the engine, a second rotating element transmitting torque of the first motor, and a third rotating element transmitting torque to the drive wheel, a clutch controlling a capacity of torque that acts on any one of the first rotating element, the second rotating element and the third rotating element, and a control unit. The control method includes: changing from an EV mode, in which the hybrid vehicle travels in a state where the clutch is released and an output torque of the second motor is transmitted to the drive wheel, to an HV mode, in which the hybrid vehicle travels in a state where the clutch is engaged and an output torque of the engine is transmitted to the drive wheel, by the control unit in the following manner, (a) starting the engine in a state where the clutch is slipped, and (b) increasing a rotation speed of the drive wheel by outputting torque from the first motor such that torque input from the first rotating element to the differential mechanism is output from the third rotating element, when torque is transmitted from the engine while a rotation speed of the first rotating element is rising in a state where the clutch is slipped.

According to the aspects of the invention, the engine is started in a state where the clutch is slipped. Therefore, it is possible to reduce torque that acts in a direction to decrease the engine rotation speed at an engine start, with the result that it is possible to quickly increase the rotation speed of the engine by torque caused by initial combustion of the engine or torque that is generated after the engine start. When torque starts to be transmitted from the engine so as to increase the rotation speed of the first rotating element while the clutch is slipped, torque starts being output from the first motor such that torque is output from the third rotating element of the differential mechanism in a direction to increase the rotation speed of the drive wheel. Therefore, it is possible to quickly transmit the output torque of the engine to the drive wheel, so it is possible to improve the response of control for changing from the EV mode to the HV mode.

When the engine rotation speed becomes higher than or equal to the rotation speed of the first rotating element, torque starts being output from the first motor such that torque is output from the third rotating element of the differential mechanism in a direction to increase the rotation speed of the drive wheel. Thus, inertia torque of the engine is transmitted to the differential mechanism via the first rotating element in addition to the output torque of the engine. Therefore, it is possible to increase torque that is input to the differential mechanism via the first rotating element. As a result, it is possible to increase torque that is transmitted to the drive wheel at the time of changing from the EV mode to the HV mode, so it is possible to improve the response of control for changing from the EV mode to the HV mode.

Furthermore, by controlling an output torque of the first Motor to zero at an engine start, it is possible to quickly increase the engine rotation speed and to suppress or prevent transmission of output torque, increased transitionally during initial combustion, to the drive wheel.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The invention provides a device and method that control a hybrid vehicle including an engine and a motor or motor generator (hereinafter, a motor or a motor generator may be collectively referred to as motor) as driving force sources. This kind of vehicle is able to not only travel by the engine or travel by both the engine and the motor but also, for example, travel by only the motor or travel while regenerating energy by the motor, and is further able to select a drive mode, that is, for example, a mode in which the engine is stopped while the vehicle is traveling by the motor and the engine is restarted. In a so-called EV drive mode in which the vehicle travels by using the motor as the driving force source, it is preferable to suppress a power loss resulting from rotation together with the engine, and, in the case of an EV drive mode in which a plurality of motors are provided and the vehicle travels by any one of the motors, it is preferable to reduce a power loss resulting from not only rotation together with the engine but also rotation together with the other motor that is not outputting power. In response to such a request, a clutch that separates the engine from a power transmission system transmitting power ₊o a drive wheel may be provided, and the invention is applied to a control unit that is intended for this kind of hybrid vehicle including a clutch.

Figure 6:
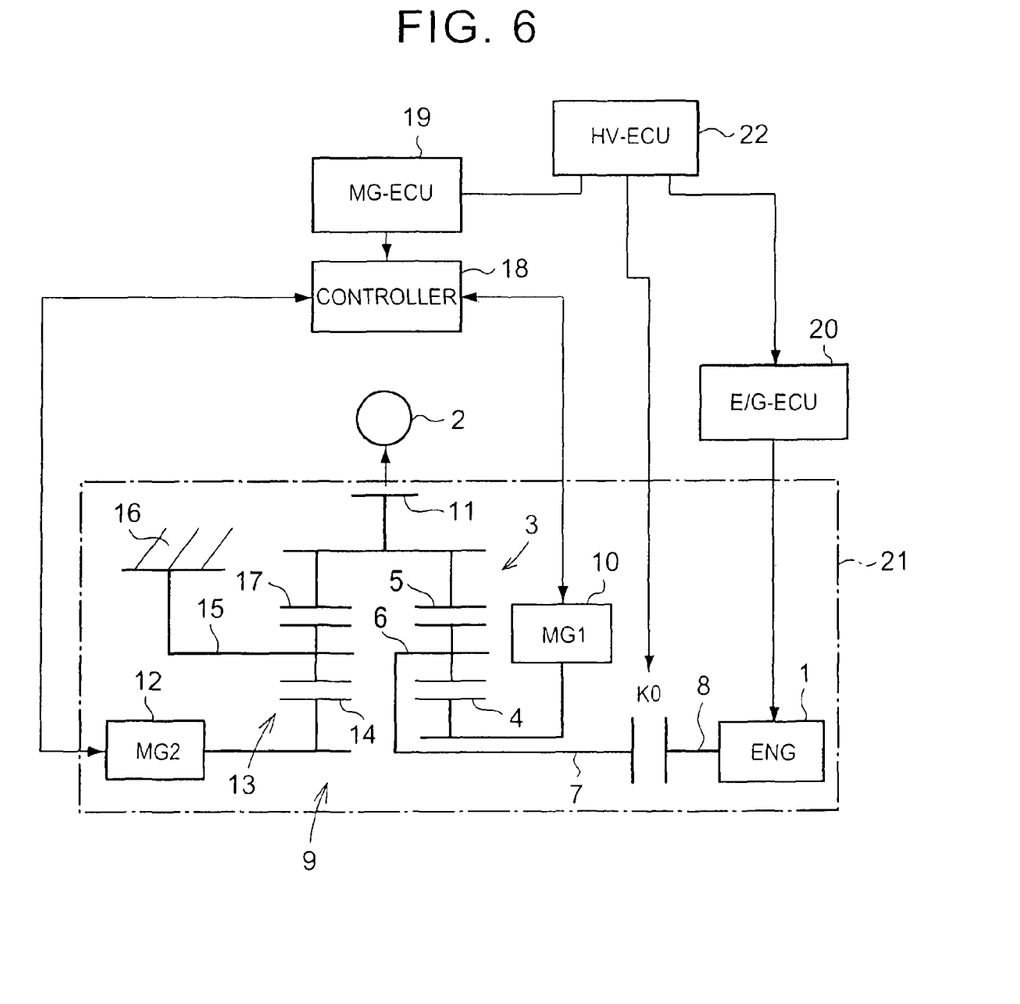
FIG. 6 is a skeletal view that shows an example of a gear train of a hybrid vehicle that is allowed to be intended by the invention.

FIG. 6 schematically shows an example of a gear train in the above-described hybrid vehicle including a clutch. In an example illustrated here, part of power output from an engine (ENG) 1 is transmitted to a drive wheel 2 by mechanical means, while the other part of power output from the engine 1 is once converted to electric power, the electric power is reversely converted to mechanical power and then the mechanical power is transmitted to the drive wheel 2. A power split mechanism 3 is provided to split power, output from the engine 1, in this way. The power split mechanism 3 has a similar configuration to a power split mechanism in an existing two-motor-type hybrid drive system. In the example shown in FIG. 6, the power split mechanism 3 is formed of a differential mechanism that produces differential action by three rotating elements, and is, for example, formed of a single-pinion-type planetary gear mechanism. The single-pinion-type planetary gear mechanism is formed of a sun gear 4, a ring gear, and a carrier 6. The ring gear 5 is arranged concentrically with respect to the sun gear 4. The carrier 6 holds pinion gears such that each pinion gear is rotatable and revolvable. Each pinion gear is in mesh with these sun gear 4 and ring gear 5.

The carrier 6 serves as an input element, and an input shaft 7 is coupled to the carrier 6. A clutch K0 is provided between the input shaft 7 and an output shaft (crankshaft) 8 of the engine 1. The clutch K0 couples the engine 1 to a power transmission system 9, including the power split mechanism 3, and the like, or separates the engine 1 from the power transmission system 9. The clutch K0 is formed of a friction clutch that continuously changes between a completely released state where the transmission torque capacity is "0" to a completely engaged state where there is no slip.

The friction clutch may be an existing known dry-type clutch or wet-type clutch, and may be a single-disc-type clutch or a multi-disc-type clutch. Furthermore, an actuator that changes the clutch K0 between an engaged state and a released state may be a hydraulic actuator, an electromagnetic actuator, or the like. For example, in the case of a wet single-disc clutch that is employed in an existing vehicle, the engaged state is kept by a so-called return mechanism, such as a diaphragm spring, by setting the actuator to a non-operated state. Thus, the transmission torque capacity of the clutch K0 changes with the operation amount of the actuator for engaging or releasing the clutch K0, and the transmission torque capacity of the clutch K0 correlates with the operation amount of the actuator. More specifically, the hydraulic pressure, current value or stroke amount of the actuator is substantially directly proportional to the transmission torque capacity. Thus, the transmission torque capacity may be prepared in form of a map, or the like, in advance as a value for the operation amount, such as the stroke amount and hydraulic pressure of the actuator. When the coefficient of friction varies with time, the correlation between the transmission torque capacity and the above-described operation amount changes.

The sun gear 4 serves as a reaction element, and a first motor generator (MG1) 10 is coupled to the sun gear 4. The first motor generator 10 is a motor having a power generating function, and is formed of a permanent magnet synchronous motor, or the like. In addition, the ring gear 5 serves as an output element. An output gear 11 that is an output member is integrated with the ring gear 5. The ring gear 5 is configured to output driving force from the output gear 11 to the drive wheel 2. A mechanism for transmitting driving force from the output gear 11 to the drive wheel 2 includes a differential gear and a drive shaft, and is similar to that of the existing vehicle, so the detailed description is omitted.

The above-described engine 1, power split mechanism 3 and first motor generator 10 are arranged along the same axis, and a second motor generator 12 is arranged along an extended line of the axis. The second motor generator 12 generates driving force for propelling the vehicle or regenerates energy, and is formed of a permanent magnet synchronous motor as well as the above-described first motor generator 10. The second motor generator 12 and the output gear 11 are coupled to each other via a speed reduction mechanism 13. In the example shown in FIG. 6, the speed reduction mechanism 13 is formed of a single-pinion-type planetary gear mechanism. The second motor generator 12 is coupled to the sun gear 14, the carrier 15 is fixedly coupled to a fixing portion 16, such as a housing, and the ring gear 17 is integrated with the output gear 11.

Each of the above-described motor generators 10, 12 is electrically connected to a controller 18 including an electrical storage device, an inverter, and the like. A motor generator electronic control unit (MG-ECU) 19 that controls the controller 18 is provided. The electronic control unit 19 is mainly formed of a microcomputer, and is configured to carry out computation on the basis of input data, stored data, a command signal, or the like, and output the computation result to the controller 18 as a control command signal. Each of the motor generators 10, 12 functions as a motor or a generator in response to a control signal from the controller 18, and torque in each mode is configured to be controlled.

The above-described engine 1 is configured such that its output and start-up/stop are electrically controlled. For example, in the case of a gasoline engine, a throttle opening degree, the amount of fuel supplied, a stop of supply of fuel, a start and stop of ignition, ignition timing, and the like, are configured to be electrically controlled. An engine electronic control unit (E/G-ECU) 20 for executing the control is provided.

The electronic control unit 20 is mainly formed of a microcomputer, and is configured to carry out computation on the basis of input data or a command signal, output the computation result to the engine 1 as a control signal and control the above-described various controls.

The above-described engine 1, motor generators 10, 12, clutch K0, power split mechanism 3, and the like, constitute a driving force source 21. A hybrid electronic control unit (HV-ECU) 22 that controls the driving force source 21 is provided. The electronic control unit 22 is mainly formed of a microcomputer, and is configured to execute various controls that will be described below by outputting command signals to the above-described motor generator electronic control unit 19 and engine electronic control unit 20.

Figure 7:
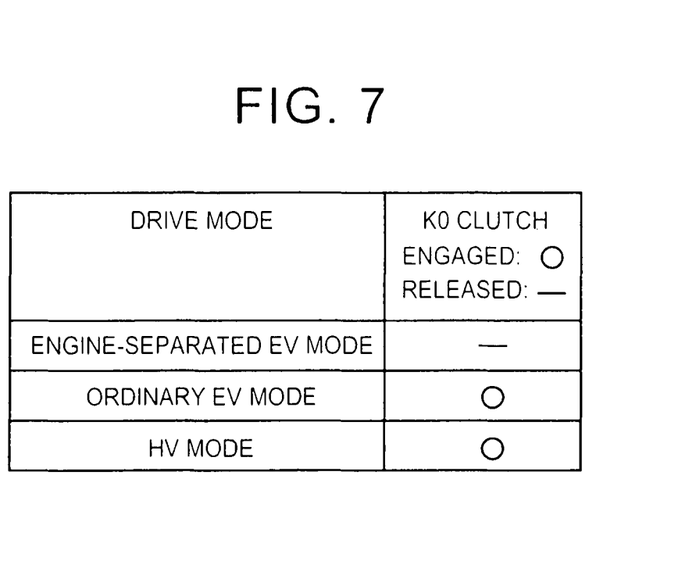
FIG. 7 is a table that shows all the engaged and released states of a clutch in each drive mode.

In a hybrid drive system shown in FIG. 6, a hybrid (HV) mode in which the vehicle travels by the use of the power of the engine 1 or an electric vehicle (EV) mode in which the vehicle travels by the use of electric power is allowed to be set. Moreover, as the EV mode, an engine-separated EV mode in which the engine 1 is separated from the power transmission system 9 or an ordinary mode in which the engine 1 is coupled to the power transmission system 9 is allowed to be set. The engaged and released states of the clutch K0 at the time when any one of these modes is set are shown in FIG. 7. That is, the clutch K0 is released in the engine-separated EV mode; whereas the clutch K0 is engaged in the ordinary EV mode or the HV mode. These drive modes are selected on the basis of a required driving amount, such as an accelerator operation amount, and a vehicle traveling state, such as a vehicle speed and the state of charge (SOC) of the electrical storage device. For example, when the vehicle travels at a certain high speed and the accelerator operation amount is increased to some extent in order to keep the vehicle speed, the HV mode is selected. In contrast, for example, when the SOC is sufficiently high and the accelerator operation amount is relatively small, or in a traveling state where it is highly likely to restart the stopped engine 1, the ordinary EV mode is set. In addition, for example, when the EV mode is selected through driver's manual operation or the vehicle is able to travel by the use of only electric power, and it is required to suppress a power loss resulting from rotation together with the first motor generator 10, the engine-separated EV mode is selected.

Figure 8:
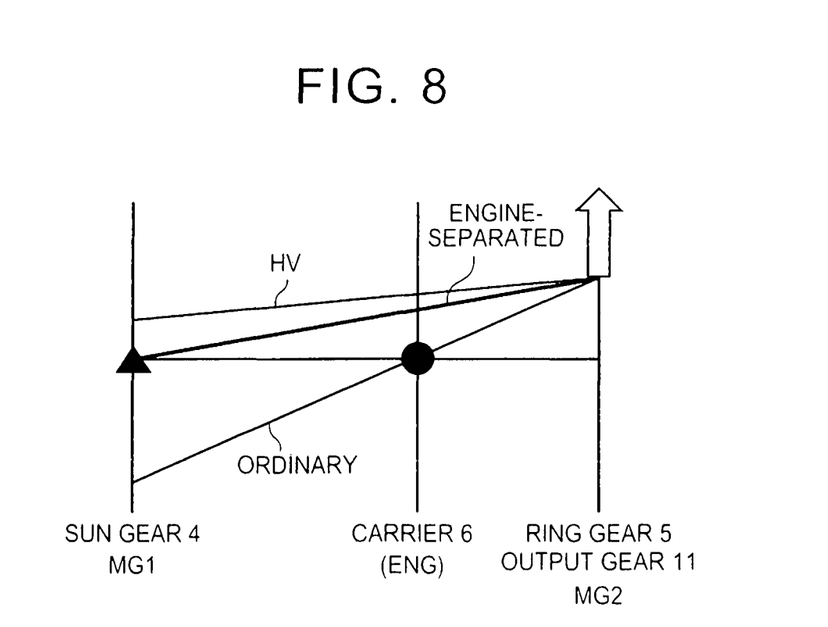
FIG. 8 is a collinear diagram for illustrating operating states in each drive mode.

The operating state of the hybrid drive system in each drive mode will be simply described. FIG. 8 is a collinear diagram regarding the above-described power split mechanism 3. The collinear diagram represents the sun gear 4, the carrier 6 and the ring gear 5 in ordinate lines, and the intervals therebetween correspond to the gear ratios of the planetary gear mechanism that constitutes the power split mechanism 3. In addition, the vertical direction of each of the ordinate lines represents a rotation direction, and the vertical position represents a rotation speed. The line indicated by "engine-separated" in FIG. 8 represents an operating state in the engine-separated EV mode. In this drive mode, the second motor generator 12 is caused to function as a motor, the vehicle travels by the use of the power of the second motor generator 12, the engine 1 is separated from the power transmission system 9 by releasing the clutch K0 and is stopped, and the first motor generator 10 is also stopped. Thus, rotation of the sun gear 4 is stopped; whereas the ring gear 5 rotates in the forward direction together with the output gear 11, and the carrier 6 rotates in the forward direction at a rotation speed reduced in speed from the rotation speed of the ring gear 5 in accordance with the gear ratio of the planetary gear mechanism.

The line indicated by "ordinary" in FIG. 8 represents an operating state in the ordinary EV mode. In this drive mode, the vehicle travels by the use of the power of the second motor generator 12, and the engine 1 is stopped. Therefore, in a state where the carrier 6 is fixed, the ring gear 5 rotates in the forward direction, and the sun gear 4 rotates in the reverse direction. In this case, the first motor generator 10 is allowed to function as a generator. In addition the line indicated by "HV" in FIG. 8 shows an operating state in the HV mode. The engine 1 is outputting driving force in a state where the clutch K0 is engaged, so torque acts on the carrier 6 in a direction to rotate the carrier 6 in the forward direction. In this state, by causing the first motor generator 10 to function as a generator, torque in the reverse rotation direction acts on the sun gear 4. As a result, torque in a direction to rotate the ring gear 5 in the forward direction appears in the ring gear 5. In this case, electric power generated by the first motor generator 10 is supplied to the second motor generator 12, the second motor generator 12 functions as a motor, and the driving force is transmitted to the output gear 11. Thus, in the HV mode, part of power output from the engine 1 is transmitted to the output gear 11 via the power split mechanism 3. The remaining power is converted by the first motor generator 10 to electric power, the electric power is transmitted to the second motor generator 12, then the electric power is converted again by the second motor generator 12 to mechanical power, and the mechanical power is transmitted to the output gear 11. In any drive mode, when it is not required to actively output driving force during deceleration, or the like, any one of the motor generators 10, 12 is caused to function as a generator, and energy is regenerated.

As described above, the hybrid vehicle intended by the invention is able to travel by the use of electric power by releasing the clutch K0, and, when the SOC of the electrical storage device is low or the required driving force is large, the engine 1 is started, and the power of the engine 1 is transmitted to the power transmission system 9 via the clutch K0. The clutch K0 is released or engaged as a result of such a change of the drive mode, and torque changes at the time when the clutch K0 is engaged or released. The change in torque is significantly influenced by a change in the transmission torque capacity of the clutch K0. The control unit according to the invention is configured to estimate the transmission torque capacity of the clutch K0 (which may, be referred to as clutch torque) and to execute control for engaging or releasing the clutch K0 by utilizing the estimated result. This is to avoid or suppress a shock, a feeling of strangeness, or the like, by executing control such that torque that is transmitted via the clutch K0 smoothly changes.

Figure 1:
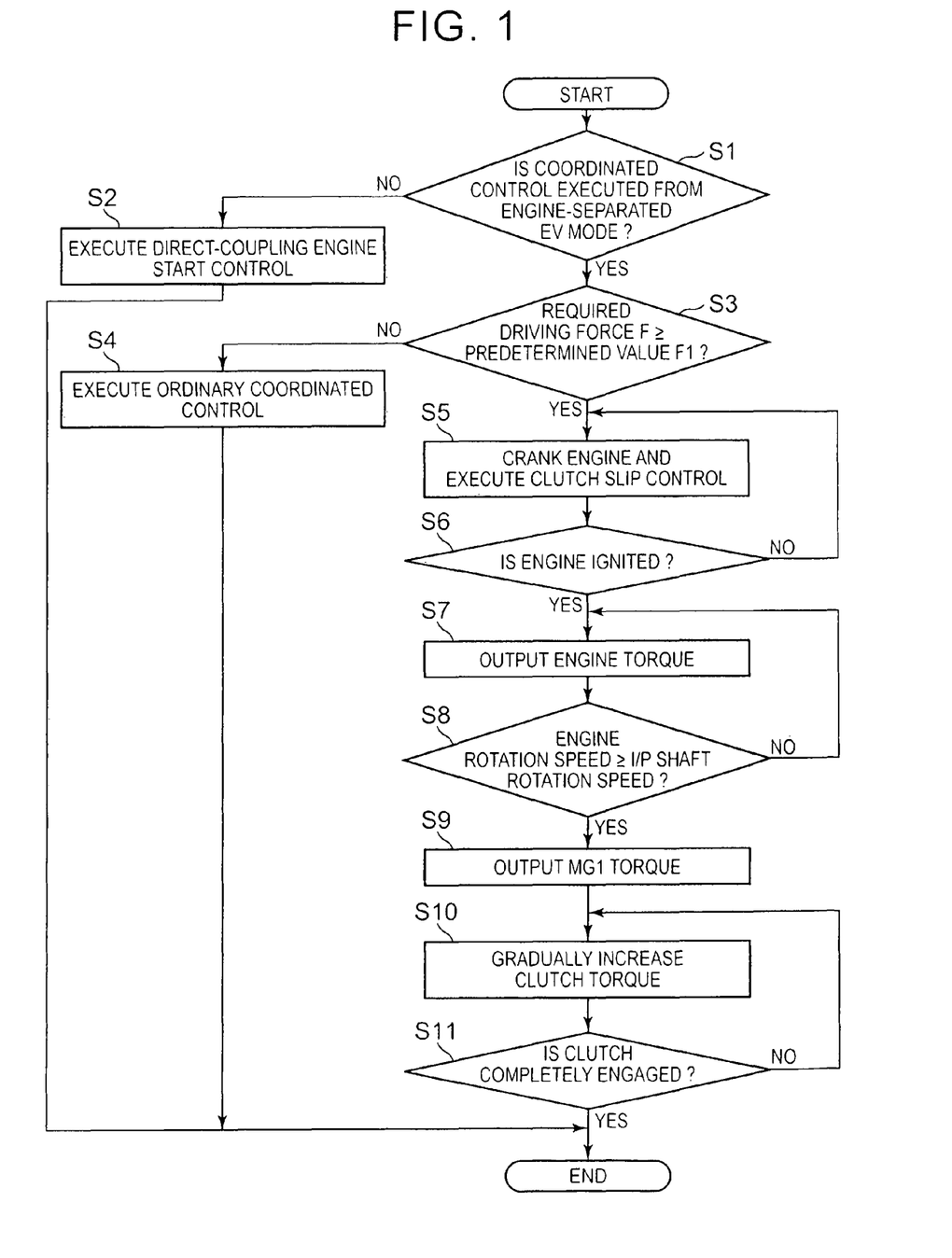
FIG. 1 is a flowchart for illustrating an example of control that is executed in a control unit according to the invention.

FIG. 1 is a flowchart for illustrating an example of the control unit according to the invention. This routine is, for example, executed when a condition for executing engine start control is satisfied. In the engine-separated EV mode, the vehicle is driven by the use of only the output torque of the second motor generator 12, so an outputtable driving force is smaller than that in the HV mode. In addition, in terms of the characteristics of the second motor generator 12, the rotation speed at which torque is outputtable from the second motor generator 12 is limited. Furthermore, it is not possible to supply electric power to the second motor generator 12 when the SOC has decreased to a lower limit value, so torque may not be outputtable from the second motor generator 12. Thus, the condition for executing the above-described engine start control is satisfied, for example, when the required driving force is larger than a driving force at which torque is outputtable from the second motor generator 12 as a result of an increase in the depression amount of an accelerator pedal (not shown), when the vehicle speed is higher than or equal to a vehicle speed at which torque is outputtable from the second motor generator 12 or when the SOC has decreased to the lower limit value.

When the condition for executing engine start control is satisfied, it is initially determined whether to execute coordinated control for cranking and starting the engine 1 while controlling the engagement pressure of the clutch K0 from the engine-separated EV mode (step S1). Thus, for example, when there is a large rotation speed difference between the input-side rotating member and output-side rotating member of the clutch K0 or when the temperature of the clutch K0 is high, it is not preferable to half-engage the clutch K0, so negative determination is made in step S1. Specifically, when the engine-separated EV mode is set and the vehicle is travelling at a relatively high vehicle speed, the rotation speed of an input shaft 7 that is the output-side rotating member of the clutch K0 rises because rotation of the first motor generator 10 is stopped, so negative determination is made in step S1. When the temperature of the clutch K0 or the temperature of oil that is supplied to the clutch K0 is higher than or equal to a predetermined temperature set in view of the durability, or the like, of the clutch K0, negative determination is made in step S1. In the following description, control for cranking and starting the engine 1 while controlling the engagement pressure of the clutch K0 may be simply referred to as coordinated control.

When negative determination is made in step S1, for example, because there is a large rotation speed difference between the input-side rotating member and output-side rotating member of the clutch K0 or the temperature of the clutch K0 is high, direct-coupling engine start control is executed (step S2), after which the routine once ends. The direct-coupling engine start control will be simply described. The clutch K0 is synchronized by controlling the rotation speed of the first motor generator 10 such that the rotation speed of the input shaft 7 becomes "0", and then the clutch K0 is engaged. After the clutch K0 is completely engaged, the engine rotation speed is increased to a predetermined rotation speed by raising the rotation speed of the first motor generator 10, and the engine 1 is ignited.

On the other hand, when affirmative determination is made in step S1, for example. because there is a relatively small rotation speed difference between the input-side rotating member and output-side rotating member of the clutch K0 or when the temperature of the clutch K0 is relatively low, it is determined whether a required driving force F is larger than or equal to a predetermined value F1 (step S3). In the HV mode, the output power of the engine 1 is determined on the basis of the required driving force F, and the operating point of the engine 1 is determined on the basis of the output power and a predetermined optimal fuel economy line at which the fuel economy of the engine 1 is high. Thus, in step S3, it may be determined whether the target rotation speed of the engine 1 is higher than or equal to a predetermined rotation speed. The predetermined value F1 in step S3 may be set to a driving force at which the operating point of the engine 1, determined on the basis of the required driving force F and the optimal fuel economy line, is higher than or equal to an initial-combustion rotation speed at an engine start. Step S3 determines whether it is possible to quickly transmit the output torque of the engine 1 to the drive wheel by raising the engine rotation speed after the engine 1 is started. That is, the predetermined value F1 is a value determined on the basis of required acceleration response characteristics. Thus, in the case of a vehicle that requires high accelerating ability, the predetermined value F1 in step S3 may be set to a relatively small value. The predetermined value F1 may be reduced when the rate of change in the required driving force F is large, for example, when the accelerator pedal is rapidly operated. That is, the predetermined value F1 in step S3 may be a predetermined value or may be a value that is variable on the basis of, for example, the traveling state.

When the required driving force F is relatively small and negative determination is made in step S3, it is relatively a short period of time from when the engine 1 is started to when the output torque of the engine 1 is transmitted to the drive wheel 2 by, for example, raising the engine rotation speed. Therefore, the engine 1 is started through ordinary coordinated control (step S4), after which the routine once ends. In the ordinary coordinated control, the engine 1 is cranked by executing coordinated control over the torque capacity of the clutch K0 and the output torque of the first motor generator 10, and then the clutch K0 is completely engaged. After the clutch K0 is completely engaged with no slip, the engine 1 is ignited. Specifically, the output torque of the first motor generator 10 is controlled to a value obtained by subtracting a predetermined value from a value obtained by multiplying the torque capacity of the clutch K0 by the gear ratio. Here, the torque capacity of the clutch K0 is a value incorporating the durability of the clutch K0, a value at which no shock occurs in the vehicle, or the like, and the predetermined value is determined such that the rotation speed of the carrier 6 is increased. By executing coordinated control in this way, it is possible to gradually increase the engine rotation speed. That is, it is possible to crank the engine 1, and it is possible to synchronize the clutch K0 and completely engaging the clutch K0. In ordinary coordinated control, it is preferable that, when the engine rotation speed is increased to a rotation speed at which the engine 1 is started, the engine rotation speed coincides with the rotation speed of the carrier 6, that is, the clutch K0 is synchronized.

In the case where the required driving force F is relatively large, if the above-described ordinary coordinated control is executed, the engine 1 is started, and then the engine rotation speed is increased to a target engine rotation speed based on the required driving force F by raising the rotation speed of the first motor generator 10. In such a case, while the engine rotation speed is being increased to the target engine rotation speed, the output torque of the engine 1 is not transmitted to the drive wheel 2 as driving force. Therefore, in the control example shown in FIG. 1, when the required driving force F is relatively large and affirmative determination is made in step S3, initially, the engine 1 is cranked by executing coordinated control over the output torque of the first motor generator 10 and the torque capacity of the clutch K0 (step S5). Specifically, while the clutch K0 undergoes slip control, the output torque of the first motor generator 10 is output in a direction in which the engine rotation speed rises. The output torque of the first motor generator 10 and the torque capacity of the clutch K0 may be the same as those in ordinary coordinated control. The output torque of the first motor generator 10 may be larger than that of the ordinary coordinated control. When the engine 1 is cranked in step S5, the torque capacity of the Clutch K0 is controlled such that the clutch K0 slips. Thus. there is a case where the engine rotation speed coincides with the rotation speed of the carrier 6 or a case where the engine rotation speed is different from the rotation speed of the carrier 6.

Figure 2:
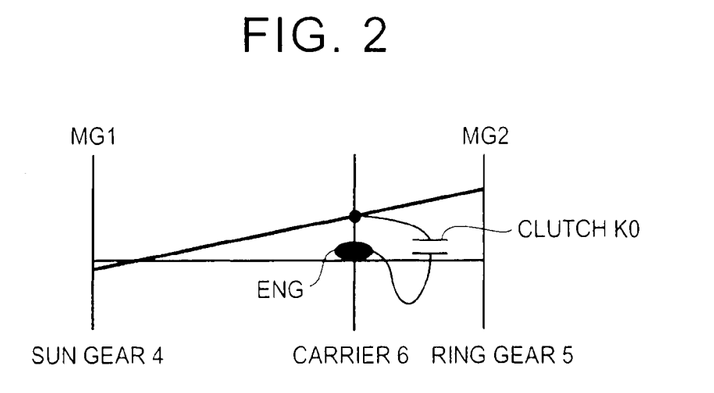
FIG. 2 is a collinear diagram that shows operating states of rotating elements of a power split mechanism when an engine is being cranked.

An example of the operating states of the rotating elements of the power split mechanism 3 at the time when step S5 is being executed is shown in FIG. 2. In the example shown in FIG. 2, the engine rotation speed is increased by slipping the clutch K0. At this time, when torque is output from the first motor generator 10 to the upper side shown in FIG. 2, it is possible to crank the engine 1 by the use of the output torque. Step S5 just needs to crank the engine 1 while the clutch K0 is slipped. Therefore, a starter motor (not shown) may be provided and the engine 1 may be cranked by the starter motor. That is, it is not limited to cranking of the engine 1 by the use of the output torque of the first motor generator 10 or traveling inertia that is transmitted to the engine 1 via the clutch K0.

When the engine 1 is cranked in step S5 and the engine rotation speed rises to the predetermined rotation speed at which the engine is allowed to be started, the engine 1 is ignited (step S6). Conversely, when the engine rotation speed has not yet risen to the predetermined rotation speed at which the engine is allowed to be started, step S5 is repeatedly executed. In order to suppress or prevent occurrence of a shock due to transmission of transitional output torque at the initial combustion of the engine 1 to the drive wheel 2 or in order to reduce torque against torque that is generated through the initial combustion of the engine 1, when the engine 1 is ignited in step S6, the output torque of the first motor generator 10 may be set to "0". When the output torque of the first motor generator 10 is controlled to "0" in this way, the power split mechanism 3 enters a neutral state. Therefore, it is possible to suppress or prevent transmission of transitional output torque at the initial combustion to the drive wheel 2. Because torque against torque that is generated at the initial combustion of the engine 1 is relatively small, the engine rotation speed is able to quickly rise.

Figure 3:
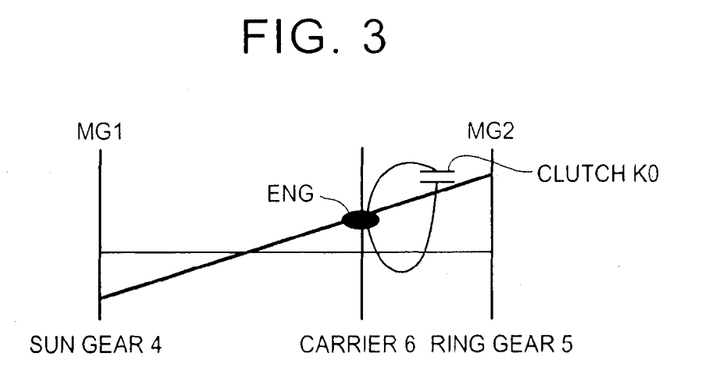
FIG. 3 is a collinear diagram that shows operating states of the rotating elements of the power split mechanism when the engine is ignited.

FIG. 3 shows an example of the operating states of the rotating elements of the power split mechanism 3 at the time when the engine 1 is ignited. In the example shown in FIG. 3, the case where the output torque of the first motor generator 10 and the torque capacity of the clutch K0 are controlled as in the case of ordinary coordinated control when the engine 1 is cranked is shown. When controlled in this way, the rotation speed of the first motor generator 10 gradually decreases, and the rotation speed of the carrier 6 gradually decreases. On the other hand, the rotation speed of the engine 1 is increased by the torque that is transmitted from the clutch K0. That is, the engine 1 is cranked as in the case of the above-described ordinary coordinated control. Thus, in the example shown in FIG. 3, the engine rotation speed coincides with the rotation speed of the carrier 6, and the rotation speed of the first motor generator 10 is increased in the reverse rotation direction as compared to the state shown in FIG. 2. In FIG. 3, the engine rotation speed coincides with the rotation speed of the carrier 6; however, for example, when the engine 1 is cranked by a starter motor or when the output torque of the first motor generator 10 is output by a larger amount than that of ordinary coordinated control, the rotation speed of the carrier 6 may be higher than the rotation speed at which the engine I is allowed to be started.

When the engine 1 is ignited in step S6, torque is output from the engine 1 (step S7). At this time, in the case of the HV mode, the amount of fuel supplied to the engine 1 is controlled such that the output power of the engine 1, determined on the basis of the required driving force F, is obtained, and the opening degree of the throttle valve, or the like, is controlled such that the rotation speed of the engine 1 becomes the operating point of the engine 1, which is determined on the basis of the required driving force F and the optimal fuel economy line. Subsequently, it is determined whether the rotation speed of the engine, which is the input-side member of the clutch K0, is higher than or equal to the rotation speed of the input shaft (I/P shaft) 7 that is the output-side member of the clutch K0 (step S8). Specifically, when the engine rotation speed is lower than the rotation speed of the input shaft 7 at the timing at which the engine 1 is ignited, because the clutch K0 is slipped, the engine rotation speed is increased so as to become the above-described operating point without a restraint of the rotation speed of the input shaft 7. Therefore, when a predetermined time elapses after an engine start, the engine rotation speed becomes higher than the rotation speed of the input shaft 7, and affirmative determination is made in step S8. When the rotation speed of the input shaft 7 is lower than the rotation speed at the timing at which the engine 1 is started, the engine 1 is ignited, and affirmative determination is made in step S8 at the same time. When the engine rotation speed is lower than the rotation speed of the input shaft 7, step S7 is repeatedly executed until the engine rotation speed rises and becomes higher than or equal to the rotation speed of the input shaft 7.

When affirmative determination is made in step S8, the output torque of the engine 1 is transmitted to the input shaft 7. In other words, the output torque of the engine 1 is transmitted such that the rotation speed of the input shaft 7 or carrier 6 is increased. Therefore, torque transmitted to the input shaft 7 is transmitted to the drive wheel 2. More specifically, the output torque of the first motor generator 10 is controlled such that the torque transmitted from the engine 1 to the input shaft 7 acts in a direction to increase the rotation speed of the ring gear 5 (step S9). Specifically, the output torque of the first motor generator 10 is controlled to a torque obtained by multiplying the torque capacity of the clutch K0 by the gear ratio. When the output torque of the first motor generator 10 is controlled in this way, the first motor generator 10 undergoes power running control or regenerative control on the basis of the rotation speed of the carrier 6 and the vehicle speed.

While the output torque of the first motor generator 10 is controlled so as to become the reaction force of torque input to the power split mechanism 3 via the clutch K0 as described above, the torque capacity of the clutch K0 is gradually increased (step S10). The torque capacity of the clutch K0 may be determined in the rate of increase in consideration of the durability, and the like, of the clutch K0, may be determined on the basis of a difference between the input-side rotation speed and output-side rotation speed of the clutch K0 or may be determined on the basis of a difference between an actual engine rotation speed and a target rotation speed. That is, the torque capacity of the clutch K0 just needs to be increased, and any method of increasing the torque capacity is used.

Figure 4:
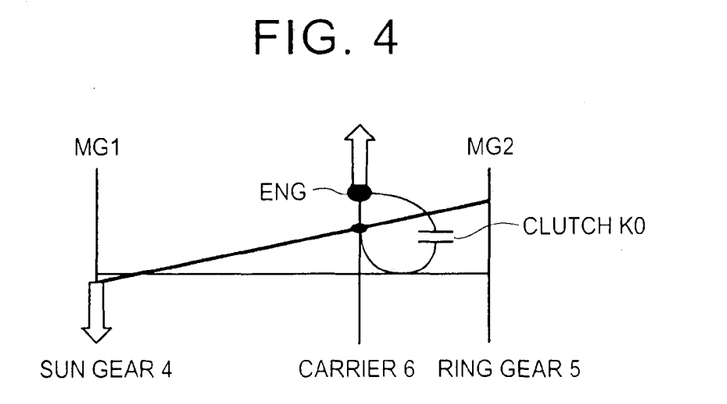
FIG. 4 is a collinear diagram that shows operating states of the rotating elements of the power split mechanism when output torque of the engine is being transmitted to a drive wheel while a clutch is half-engaged.

FIG. 4 shows an example of the operating' states of the rotating elements of the power split mechanism 3 is a state where the output torque of the first motor generator 10 is controlled such that torque transmitted from the engine 1 acts in a direction to increase the rotation speed of the ring gear 5, that is, the torque acts as reaction force in the power split mechanism 3, while the torque capacity of the clutch K0 is controlled. As shown in FIG. 4, the rotation speed of the engine 1 is higher than the rotation speed of the input shaft 7, that is, the rotation speed of the carrier 6. Because the output torque of the engine 1 is transmitted to the input shaft 7 via the clutch K0, the rotation speed of the input shaft 7 rises. In addition, the output torque of the first motor generator 10 is controlled as the reaction force against the torque transmitted from the input shaft 7 to the power split mechanism 3, the torque transmitted to the power split mechanism 3 is transmitted to the drive wheel 2 via the ring gear 5. In the example shown in FIG. 4, the first motor generator 10 undergoes power running control. The rotation speed of the carrier 6 is increased by the output torque of the engine 1, so the rotation speed of the first motor generator 10 is closer to "0" than the rotation speed shown in FIG. 3 accordingly.

By gradually raising the torque capacity of the clutch K0 in step S10, the difference between the input-side rotation speed and output-side rotation speed of the clutch K0 gradually reduces, and those rotation speeds finally coincide with each other. When the input-side rotation speed and output-side rotation speed of the clutch K0 coincide with each other in this way, the clutch K0 is completely engaged. Thus, after step S10, it is determined whether the clutch K0 is completely engaged (step S11). When the clutch K0 is completely engaged and affirmative determination is made in step S11, the routine once ends. Conversely, when the input-side rotation speed and output-side rotation speed of the clutch K0 have not yet coincided with each other and the clutch K0 is not completely engaged, negative determination is made in step S11, and step S10 is repeatedly executed until the clutch K0 is completely engaged.

Figure 5:
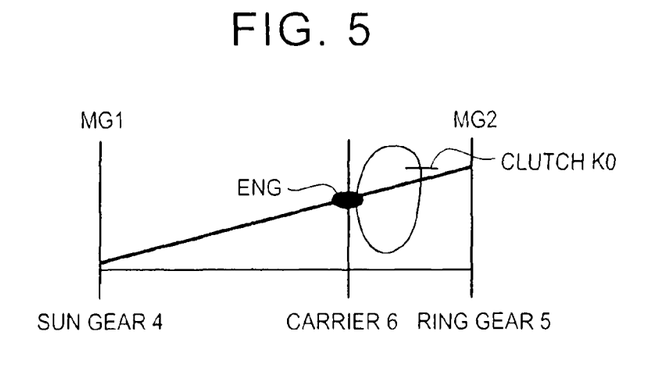
FIG. 5 is a collinear diagram that shows operating states of the rotating elements of the power split mechanism when the clutch is completely engaged.

FIG. 5 shows an example of the operating states of the rotating elements of the power split mechanism 3 at the time when the clutch K0 is completely engaged. In the example shown in FIG. 5, the output power of the engine 1 is controlled on the basis of the required driving force F. Thus, in the collinear diagram shown in FIG. 5, the output torque of the engine 1 is transmitted in the upward direction. On the other hand, the output torque of the first motor generator 10 is controlled so as to become the reaction force of the power split mechanism 3, and the rotation speed of the first motor generator 10 is controlled such that the rotation speed of the engine 1 becomes a rotation speed that is determined on the basis of the required driving force F and the optimal fuel economy line. Thus, the direction of the output torque of the first motor generator 10 is the downward direction in FIG. 5. When the rotation speed of the first motor generator 10 at that time is in the forward rotation direction, the first motor generator 10 functions as a generator; whereas, when in the reverse rotation direction, the first motor generator 10 functions as a motor.

By slipping the clutch K0 at the time when the engine 1 is ignited as described above, it is possible to suppress or prevent torque from acting against torque that is generated through the initial combustion of the engine 1, so it is possible to quickly increase the engine rotation speed. Similarly, while the engine rotation speed is lower than the rotation speed of the input shaft 7 as well, by slipping the clutch K0, it is possible to quickly increase the engine rotation speed by the use of energy generated by the engine 1. In other words, it is not required to increase the engine rotation speed by controlling the rotation speed of the first motor generator 10. When the engine 1 is ignited and the engine rotation speed becomes higher than the rotation speed of the input shaft 7, the output torque of the engine 1 and the inertia torque of the engine 1 are transmitted to the power split mechanism 3. At this time, by controlling the output torque of the first motor generator 10 as the reaction force of the power split mechanism 3, it is possible to transmit torque, transmitted from the engine 1 to the power split mechanism 3, to the drive wheel 2. Therefore, it is possible to reduce a time up to when the engine rotation speed is increased, and it is possible to transmit torque to the drive wheel 2 before the engine rotation speed rises to the target rotation speed. As a result, at the time of changing from the engine-separated EV mode to the HV mode, it is possible to reduce a time in which no driving force is output. In other words, it is possible to improve the response of control for changing from the engine-separated EV mode to the HV mode.

A vehicle that is allowed to be intended by the invention just needs to include a clutch that controls a torque capacity acting on any one of rotating elements of a differential mechanism. Thus, a clutch may be provided between the first motor generator 10 and the sun gear 4 or a clutch may be provided on the output side of the ring gear 5. Instead of the clutch K0, a transmission unit including a plurality of clutches may be provided. Furthermore, the differential mechanism may be a double-pinion-type planetary gear mechanism or may be another configuration having a differential action. The clutch K0 just needs to be able to control the engagement pressure. Thus, the clutch K0 may be a clutch of which the engagement pressure is controlled by hydraulic pressure, a clutch of which the engagement pressure is controlled by electromagnetic force, or the like.

What is claimed is:

1. A hybrid vehicle comprising:
   an engine;
   a drive wheel;
   a first motor;
   a second motor transmitting torque to the drive wheel;
   a differential mechanism including
      a first rotating element transmitting torque of the engine,
      a second rotating element transmitting torque of the first motor, and
      a third rotating element transmitting torque to the drive wheel;
   a clutch controlling a capacity of torque that acts on any one of the first rotating element, the second rotating element and the third rotating element; and
   a control unit configured to change from an EV mode, in which the hybrid vehicle travels in a state where the clutch is released and an output torque of the second motor is transmitted to the drive wheel, to an HV mode, in which the hybrid vehicle travels in a state where the clutch is engaged and an output torque of the engine is transmitted to the drive wheel, in the following manner,
      (a) starting the engine in a state where the clutch is slipped, and
      (b) increasing a rotation speed of the drive wheel by outputting torque from the first motor such that torque input from the first rotating element to the differential mechanism is output from the third rotating element, when torque is transmitted from the engine while a rotation speed of the first rotating element is rising in a state where the clutch is slipped,
   wherein the control unit is further configured to control an output torque of the first motor to zero when the control unit starts the engine.

2. The hybrid vehicle according to claim 1, wherein
the control unit is further configured to increase the rotation speed of the drive wheel by outputting torque from the first motor such that torque input from the first rotating element to the differential mechanism is output from the third rotating element, when a rotation speed of the engine becomes higher than or equal to the rotation speed of the first rotating element.

3. A control method for a hybrid vehicle including
an engine,
a drive wheel,
a first motor,
a second motor transmitting torque to the drive wheel,
a differential mechanism including
　a first rotating element transmitting torque of the engine,
　a second rotating element transmitting torque of the first motor, and
　a third rotating element transmitting torque to the drive wheel;
a clutch controlling a capacity of torque that acts on any one of the first rotating element, the second rotating element and the third rotating element; and
a control unit, the control method comprising:
changing from an EV mode, in which the hybrid vehicle travels in a state where the clutch is released and an output torque of the second motor is transmitted to the drive wheel, to an HV mode, in which the hybrid vehicle travels in a state where the clutch is engaged and an output torque of the engine is transmitted to the drive wheel, by the control unit in the following manner,
　(a) starting the engine in a state where the clutch is slipped, and
　(b) increasing a rotation speed of the drive wheel by outputting torque from the first motor such that torque input from the first rotating element to the differential mechanism is output from the third rotating element, when torque is transmitted from the engine while a rotation speed of the first rotating element is rising in a state where the clutch is slipped, and
controlling an output torque of the first motor to zero when the control unit starts the engine.

4. The control method according to claim 3, further comprising:
increasing the rotation speed of the drive wheel by outputting torque from the first motor such that torque input from the first rotating element to the differential mechanism is output from the third rotating element, when a rotation speed of the engine becomes higher than or equal to the rotation speed of the first rotating element.

* * * * *